March 25, 1958 — W. J. GEER — 2,827,886
VALVE ROTATOR
Filed Jan. 19, 1956 — 2 Sheets-Sheet 1

INVENTOR
William J. Geer
BY
J. C. Thorpe
ATTORNEY

United States Patent Office 2,827,886
Patented Mar. 25, 1958

2,827,886
VALVE ROTATOR

William J. Geer, Seattle, Wash., assignor to General Motors Corporation, Detroit, Mich., a corporation of Delaware Application January 19, 1956, Serial No. 560,153

6 Claims. (Cl. 123—90)

This invention relates to reciprocating elements such as internal combustion engine poppet valves, and particularly to means for introducing concurrent rotation thereof employing shiftable elements such as balls rollable on relatively inclined raceways of respectively fixed and rotatable washer-like members in the line of valve operating thrust, together with resilient means such as a Belleville spring effective to axially displace the raceway members to their initial positions and thereby free the shiftable elements so that they may index or ratchet to a new position following each rotative stroke.

While I employ a Belleville spring in my rotator as a convenient means for axially returning the raceway parts after each stroke and have arranged the shiftable balls to roll on this Belleville spring, my rotator represents a substantial improvement over prior Belleville spring incorporating rotators of this general type both in effecting greater durability and more compactness of design. In such prior art rotators the Belleville spring either suffers exceedingly high stress concentrations by being made to bow over the balls in operation, or the Belleville spring has been entirely removed from any direct contact with the balls in order to avoid such stressing. While the latter alternative accomplishes its intended purpose insofar as relieving the Belleville spring of high unit loading, it adds measurably to the cost of manufacture, the weight of the parts and the over-all size of the rotator.

Furthermore, I have found that shiftable ball type rotators as above discussed do not require the addition of positive means to prevent their retrograde rotation, it being merely sufficient that the Belleville spring or other means for re-separating the raceway parts have sufficient strength to accomplish that function.

It is accordingly the principal object of this invention to provide an improved rotator for spring biased poppet valves and like rotatably mounted reciprocating elements. The means for carrying out my invention will now be described in greater detail with reference to the attached drawings illustrative of particularly preferred embodiments of the rotator, wherein.

Figure 1:
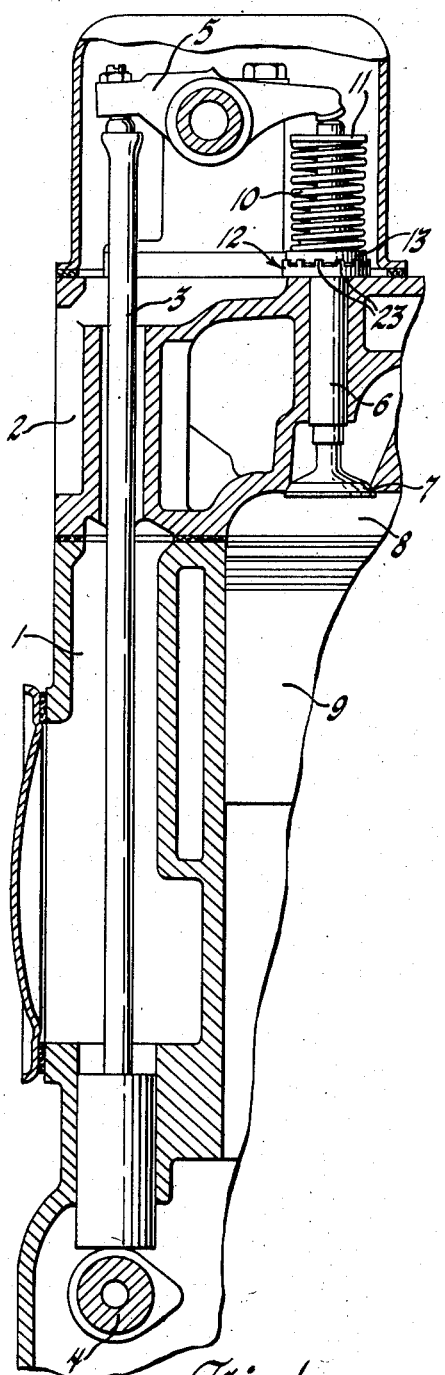
Fig. 1 is a fragmentary view of an internal combustion engine valve operating mechanism with a rotator in accordance with my invention installed between the valve return spring and the engine cylinder head.

In Figure 1 is shown a portion of an overhead valve type internal combustion engine including a cylinder block 1 and cylinder head 2 through which a push rod 3 is reciprocated by an engine driven cam 4. The push rod movements are transmitted by the usual rocker 5 above the head to the stem 6 of a poppet valve 7 opening into the combustion chamber 8 above the engine piston 9. Valve lifting strokes of the cam, push rod and rocker are opposed by the conventional coil return spring 10 whose upper end is suitably connected as at 11 to the valve stem, and whose lower end operatively reacts against a support or retaining means represented by the upper surface of the cylinder head. It will be appreciated that the valve stem is guided for reciprocation in the cylinder head and is also axially rotatable therein, and that the valve return spring 10 serves both to maintain the poppet valve closed on its seat in the combustion chamber 8 and to retain the push rod in driven relation with the cam 4.

Figure 2:
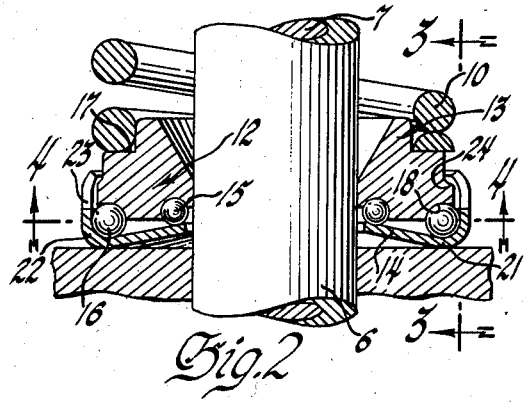
Figure 2 is an enlarged cross sectional view of the rotator shown on Figure 1.
Figure 3:
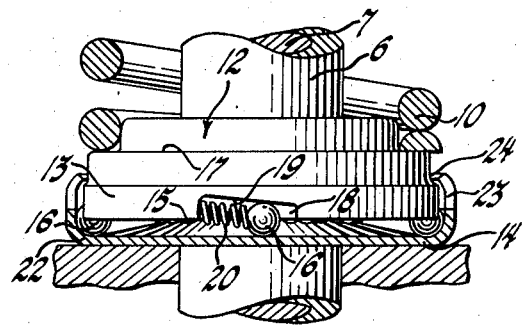
Figures 3 and 4 are sectional views taken substantially on correspondingly numbered lines of Figure 2.
Figure 4:
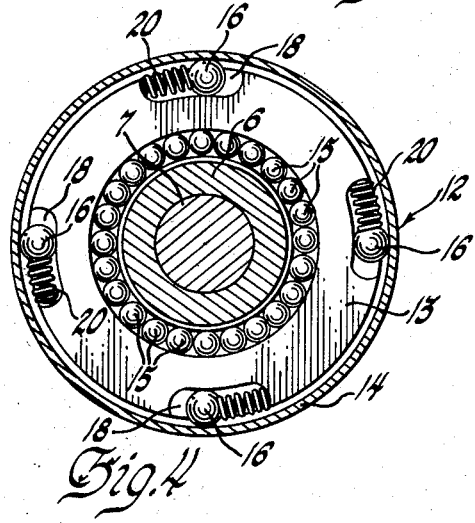

Interposed between the valve return spring and the top of the cylinder head is the valve rotator which is designated generally by the numeral 12. As best shown in Figures 2–4 the rotator 12 includes the rigid washer member 13, resilient means in the form of a Belleville spring 14, a plurality of balls 15 and a plurality of shiftable elements in the form of large balls 16. An annular surface 17 adjacent the upper end of the washer acts as a seat for the valve return spring 10. Adjacent its inner marginal edge on the opposite face of the washer 13 there is provided an annular groove which serves as a ball race for the smaller balls 15. Adjacent the outer marginal edge of this face of the washer there are a plurality of elongated circumferentially spaced raceways or recesses 18 which as best shown in Figures 3 and 4 have inclined bottom walls 19 to rollably seat the larger balls 16. Between the deeper ends of these recesses and the balls 16 are small coil springs 20 for urging the balls toward the shallower ends of the recesses from which they project and rollably engage the Belleville spring adjacent its outer marginal edge extremities. The inner marginal periphery of the Belleville spring underlies and forms a raceway surface for the smaller balls 15. In its normally dished condition shown, under the relatively light loads imposed by the valve return spring 10 when the poppet valve is closed, only the portion 21 of the Belleville spring bottom surface which is immediately opposite the larger balls 16 is in abutment with the surface of the cylinder head. For this purpose the outer extremities of the Belleville spring are turned up slightly as shown at 22 to provide an annular convex rocking surface for the Belleville to bear on the engine cylinder head. To provide means for retaining the washer 13 and the Belleville spring in relative axial alignment and prevent their excessive axial separation when removed from the engine, the outer extremities of the Belleville spring are shown with finger-like extensions 23 which telescopically embrace the sides of the washer and are turned inwardly at their extreme ends to overlie a cooperating shoulder 24 on the outer periphery of the washer.

In operation, as the thrust load of the valve return spring 10 increases during opening of the poppet valve this increased thrust is transmitted by the washer 13 through the small balls 15 to the inner marginal edge portion of the Belleville spring, causing the latter to deflect downwardly toward the cylinder head. Such deflection of the Belleville spring is accompanied by rocking of its surface portion 21 on the cylinder head at points equidistant from the washer axis with the larger balls 16. Thus, there is no localized bending stress imposed on the Belleville spring by bowing it about the balls 16. Instead, there is only a simple rocking motion of the Belleville spring on the cylinder head directly under the balls 16 since all portions of the bottom surface of the Belleville spring radially outward of the balls 16 are out of contact with the cylinder head. Such downward movement of the washer during this deflection of the Belleville spring is accompanied by rolling of the balls 16 up the inclined bottom walls 19 of the washer recesses in opposition to the light forces which the small coil springs 20 impose. This rolling movement of the balls 16 reactively imparts rotation of the washer in one direction relative to the rotatively fixed Belleville spring and cylinder head. After the poppet valve reaches is full opening stroke and begins its return movement the thrust load of the valve return spring 10 again decreases, thereby relieving the Belleville spring and enabling it to return the washer upwardly to its initial position. Such upward movement of the washer, in turn, frees the large balls 16 to return to the shallower ends in their respective recesses under the biasing action of the ball indexing springs 20, preparatory to beginning the next cycle of poppet valve reciprocation and rotation. While the smaller balls 15 prevent excessive wear between the Belleville spring and the washer during operation and serve to freely accommodate relative rotation of these parts when rolling on the larger balls during each valve opening stroke, they exhibit sufficient friction during the valve closing stroke to prevent indiscriminate rotation of the washer relative to the Belleville spring.

Figure 5:
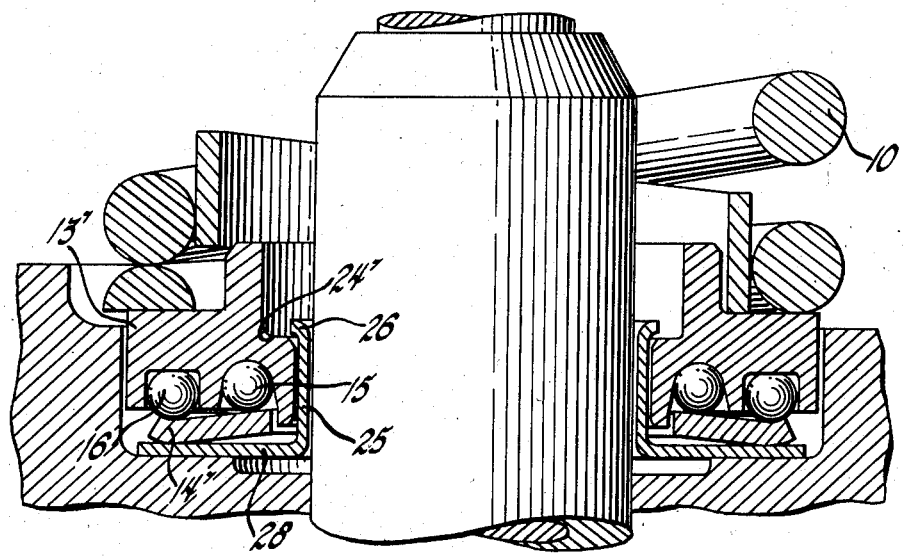
Figures 5 and 6 show alternative design variations of the rotator, that in Figure 5 being likewise arranged between the valve spring and the cylinder head, and that of Figure 6 being installed between the free end of the valve spring and the valve stem.

The rotator shown in Figure 5 operates in identically the same manner and represents merely an alternative manner of retaining the parts in assembled condition when removed from the engine. Thus, instead of the Belleville spring 14' being extended axially of the washer to form the retaining fingers 23 of the previously described rotator, a separate sleeve piece 25 has been added which extends through the washer 13' and terminates in an outwardly rolled or crimped flange portion 26 above the washer shoulder 24'. The opposite end of this sleeve is flanged outwardly at 28 to underlie the Belleville spring and provide the seating surface therefor.

Figure 6:
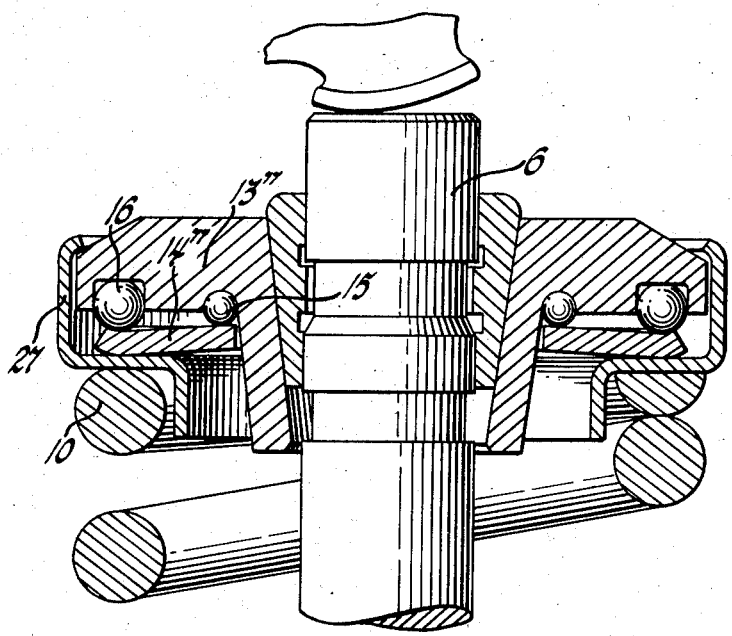

Figure 6 illustrates the rotator as designed for mounting between the live or free end of the valve spring and the valve stem. Here again, the Belleville spring 14" and the washer 13" are retained assembled by a sheet metal piece 27 fashioned separately from the Belleville spring and forming the seating surface for the latter on the valve return spring 10.

It is appreciated that numerous minor changes in the construction and arrangement of the parts may be made without departing from the spirit and scope of the invention as defined in the following claims.

I claim:

1. In a device for effecting relative rotation between two parts when subjected to increased load, a rotatable member, a member fixed against rotation with said rotatable member, resilient means interposed between said members and having respective portions in continuous bearing engagement therewith, said resilient means being yieldable under said increased load to permit movement of said rotatable member toward said fixed member, shiftable elements interposed between said rotatable member and the resilient means portion in bearing engagement with said fixed member and reacting against each thereof in oppositely rotative directions in response to said movement.

2. A device adapted to be inserted between one end of a return spring for a reciprocably actuated element and the spring retaining means for effecting progressive axial rotation of said element relative to the retaining means as said element is reciprocated, comprising a rigid member adapted to engage the return spring, a resilient member having a first portion adapted to engage the retaining means and a second portion adapted to engage said rigid member, said resilient member being yieldable under maximum loads imposed on the return spring in operation, and a plurality of rollable elements interposed between said rigid member and said resilient member first portion and reacting against each thereof to effect their relative rotation in response to yielding deflection of said resilient member.

3. In a valve rotator insertable between a valve return spring and the support for said return spring, a rigid washer having a surface adapted to seat the return spring, a Belleville spring yieldably and rotatably supporting the washer adjacent one marginal edge thereof and having an oppositely facing surface portion radially spaced from said edge adapted to seat on said support, a plurality of balls spacing the washer from the Belleville spring and radially equidistant from said edge with said surface portion, said washer having circumferentially extending inclined raceways for said balls, and means biasing the balls toward the ends of said raceways nearest the Belleville spring.

4. In a valve rotator insertable between a valve return spring and the support for said return spring, a rigid washer having a surface adjacent one marginal edge adapted to seat the return spring and an oppositely presenting annular groove adjacent the other marginal edge, a plurality of balls rollably seated in said groove, said washer further having a series of circumferentially spaced recesses with helically inclined bottom walls provided adjacent said one edge and facing in generally the same axial direction as said annular groove, balls rollably seated on said inclined bottom walls, springs in said recesses biasing said last named balls toward the shallow ends of their respective recesses, and a Belleville spring providing concentrically spaced raceways on one side thereof for said annular groove seated balls and said recessed balls, respectively, said Belleville spring being in axial alignment with said washer and having a surface adapted to seat on said support substantially equidistant radially of the washer axis with said recessed balls.

5. The rotator defined in claim 4, together with means telescopically associated with said washer and terminating with axially spaced radially extending portions limiting axial separation of the washer and Belleville spring when disassembled from the return spring.

6. In combination with a poppet valve having a stem, fixed means supporting the stem for reciprocation and axial rotation, and a coil compression spring embracing the stem and reacting in thrust between the stem and said means, of a device for inducing progressive rotation of the stem in response to cyclic increase and decrease of thrust imposed on the coil spring during reciprocation of the valve, said device comprising a rigid washer abutting one end of the coil spring, a Belleville spring disposed axially of the washer, said washer and Belleville spring having corresponding marginal peripheral portions in opposing rotary thrust transmitting relation with each other, said washer having circumferentially spaced recesses with helically inclined bottom walls in one of its said portions, balls rollably engaging said bottom walls and the opposing peripheral portion of the Belleville spring, springs urging the balls toward the shallow ends of said recesses, said Belleville spring having its face oppositely disposed from the washer in thrust transmitting relation with said means only in the section radially equidistant from the axis with said balls.

References Cited in the file of this patent

UNITED STATES PATENTS

| | | |
|---|---|---|
| 2,397,502 | Ralston | Apr. 2, 1946 |
| 2,582,060 | Newton | Jan. 8, 1952 |
| 2,662,511 | Sward | Dec. 15, 1953 |
| 2,758,583 | Norton | Aug. 14, 1956 |